(12) United States Patent
Wang

(10) Patent No.: US 11,553,156 B2
(45) Date of Patent: Jan. 10, 2023

(54) SYSTEMS AND METHODS FOR VIDEO SPLICING AND DISPLAYING

(71) Applicant: ZHEJIANG DAHUA TECHNOLOGY CO., LTD., Zhejiang (CN)

(72) Inventor: Zhenya Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 165 days.

(21) Appl. No.: 17/078,202

(22) Filed: Oct. 23, 2020

(65) Prior Publication Data
US 2021/0044778 A1    Feb. 11, 2021

Related U.S. Application Data

(63) Continuation of application No. PCT/CN2019/084675, filed on Apr. 26, 2019.

(30) Foreign Application Priority Data

Apr. 27, 2018  (CN) .......................... 201810390899.0

(51) Int. Cl.
*H04N 7/06* (2006.01)
*H04N 5/04* (2006.01)
(Continued)

(52) U.S. Cl.
CPC ............... *H04N 7/063* (2013.01); *H04N 5/04* (2013.01); *H04N 5/2624* (2013.01);
(Continued)

(58) Field of Classification Search
CPC ........ H04N 7/063; H04N 5/04; H04N 5/2624; H04N 21/4302; H04N 21/4335;
(Continued)

(56) References Cited

U.S. PATENT DOCUMENTS 6,487,212 B1    11/2002  Eriml et al.
10,148,875 B1 *  12/2018  Chen .................... H04N 21/631
(Continued)

FOREIGN PATENT DOCUMENTS

CN       101562706 A     10/2009
CN       103702013 A      4/2014
(Continued)

OTHER PUBLICATIONS

The Extended European Search Report in European Application No. 19792207.3 dated Jan. 29, 2021, 9 pages.
(Continued)

*Primary Examiner* — Michael Lee
(74) *Attorney, Agent, or Firm* — Metis IP LLC

(57) ABSTRACT

The present disclosure relates to a system and method for synchronous video display on at least one display. The method may comprises receiving a channel of video signal from each data acquisition port of a plurality of data acquisition ports during a time interval, each channel of video signal comprising a plurality of video frames captured during the time interval. The method may also comprises assigning a count value for each video frame of the channel of video signal as synchronization information for each video frame of the channel of video signal to form a pool of video frames each corresponding to a count value. The method may further comprises selecting video frames with the same count value from the pool of video frames as synchronized video frames, and transmitting, through the plurality of output ports, the synchronized video frames for synchronous display on the at least one display.

18 Claims, 9 Drawing Sheets

(51) Int. Cl.
  *H04N 5/262* (2006.01)
  *H04N 21/43* (2011.01)
  *H04N 21/4335* (2011.01)
  *H04N 21/44* (2011.01)

(52) U.S. Cl.
  CPC ..... *H04N 21/4302* (2013.01); *H04N 21/4335* (2013.01); *H04N 21/44004* (2013.01)

(58) Field of Classification Search
  CPC ......... H04N 21/44004; H04N 21/4307; H04N 21/21805; H04N 21/2187; H04N 21/23418; H04N 21/242; H04N 21/4223
  See application file for complete search history.

(56) References Cited

U.S. PATENT DOCUMENTS

| | | | |
|---|---|---|---|
| 2008/0152020 A1 | 6/2008 | Kayashima et al. | |
| 2009/0278985 A1* | 11/2009 | Chan | G06F 3/1446 348/554 |
| 2012/0293618 A1 | 11/2012 | Tsukagoshi | |
| 2013/0246576 A1* | 9/2013 | Wogsberg | H04N 21/658 709/219 |
| 2014/0348248 A1 | 11/2014 | Ihara | |
| 2015/0215497 A1* | 7/2015 | Zhang | H04N 21/6336 348/521 |
| 2016/0357493 A1* | 12/2016 | Zerwas | G09G 5/12 |
| 2018/0314483 A1* | 11/2018 | Liu | G09G 5/12 |
| 2018/0357033 A1* | 12/2018 | Welch | H04N 5/272 |
| 2019/0166376 A1* | 5/2019 | Thomas | H04N 19/174 |
| 2019/0208234 A1* | 7/2019 | Van Brandenburg | H04N 21/23439 |

FOREIGN PATENT DOCUMENTS

| | | |
|---|---|---|
| CN | 104168426 A | 11/2014 |
| CN | 105407252 A | 3/2016 |
| EP | 1320033 A2 | 6/2003 |
| JP | H11296145 A | 10/1999 |
| WO | 2019206303 A1 | 10/2019 |

OTHER PUBLICATIONS

International Search Report in PCT/CN2019/084675 dated Jul. 24, 2019, 3 pages.
Written Opinion in PCT/CN2019/084675 dated Jul. 24, 2019, 6 pages.

* cited by examiner

600

```
┌─────────────────────────────────────────────────────┐
│ Receiving a channel of video signal from each data  │
│ acquisition port of a plurality of data acquisition │
│ ports of a display control device, and storing      │   610
│ synchronization information of the each channel of  │  ∧∨
│ video signal, wherein the synchronization           │
│ information includes count values of video frames   │
│ in each channel of video signal such that any two   │
│ video frames having same count values correspond    │
│ to a same displaying time                           │
└─────────────────────────────────────────────────────┘
                            │
                            ▼
┌─────────────────────────────────────────────────────┐   620
│ Transmitting the plurality of channels of video     │  ∧∨
│ signals for synchronous display on at least one     │
│ display according to the synchronization            │
│ information of each channel of video signals        │
└─────────────────────────────────────────────────────┘
```

FIG. 6A

SYSTEMS AND METHODS FOR VIDEO SPLICING AND DISPLAYING

CROSS-REFERENCE TO RELATED APPLICATIONS

This application is a continuation of International Application No. PCT/CN2019/084675, filed on Apr. 26, 2019, which claims priority of Chinese Patent Application No. 201810390899.0, filed on Apr. 27, 2018, the entire contents of which are hereby incorporated by reference.

TECHNICAL FIELD

This disclosure generally relates to video display, and more particularly, relates to a method for video splicing and displaying and a display control device.

BACKGROUND

Conventionally, a video signal is acquired through only one data acquisition port, before being sent to a plurality of output ports in a conventional display control device. The video output from the plurality of output ports may be spliced after being processed under operations such as scaling, by the plurality of output ports. However, acquiring a video signal using only one data acquisition port and outputting the video signal through a plurality of output ports may result in low resolution of the output video.

One remedy to the low resolution output video problem is to acquire video signals at high resolution. High resolution input video signal however is subject to limitations of hardware of the display control device, for example, frequency clock, data acquisition port, data buffer, data transmission path, or limitations of signal processing such as scaling, encoding, tilting, video cutout. The single data acquisition port of the conventional display control device therefore may not be able to acquire video signals in high resolution. Thus, it is desirable to develop a device and method for providing a high definition video in video splicing and displaying.

SUMMARY

According to an aspect of the present disclosure, a method implemented on a device having a plurality of data acquisition ports, a plurality of output ports, and at least one processor having a master acquisition control controlling the acquisition ports and a master display control controlling the output ports for synchronous video display on at least one display is provided. The method may comprises receiving a channel of video signal from each data acquisition port of the plurality of data acquisition ports during a time interval, each channel of video signal comprising a plurality of video frames captured during the time interval; assigning a count value for each video frame of the channel of video signal as synchronization information for each video frame of the channel of video signal to form a pool of video frames each corresponding to a count value; selecting video frames with the same count value from the pool of video frames as synchronized video frames; and transmitting, through the plurality of output ports, the synchronized video frames for synchronous display on the at least one display.

According to another aspect of the present disclosure, a device having a plurality of data acquisition ports, a plurality of output ports, and at least one processor having a master acquisition control controlling the acquisition ports and a master display control controlling the output ports for synchronous video display on at least one display may be provided. The device may be configured to receive a channel of video signal from each data acquisition port of the plurality of data acquisition ports during a time interval, each channel of video signal comprising a plurality of video frames captured during the time interval; assign a count value for each video frame of the channel of video signal as synchronization information for each video frame of the channel of video signal to form a pool of video frames each corresponding to a count value; select video frames with the same count value from the pool of video frames as synchronized video frames; and transmit, through the plurality of output ports, the synchronized video frames for synchronous display on the at least one display.

According to a further aspect of the present disclosure, a non-transitory computer readable medium is provided. The non-transitory computer readable medium may comprises at least one set of instructions for synchronous video display on the at least one display, wherein when executed by a device including a plurality of data acquisition ports, a plurality of output ports, and at least one processor having a master acquisition control controlling the acquisition ports and a master display control controlling the output ports, the at least one set of instructions causes the device to perform a method, the method comprising: receiving a channel of video signal from each data acquisition port of the plurality of data acquisition ports during a time interval, each channel of video signal comprising a plurality of video frames captured during the time interval; assigning a count value for each video frame of the channel of video signal as synchronization information for each video frame of the channel of video signal to form a pool of video frames each corresponding to a count value; selecting video frames with the same count value from the pool of video frames as synchronized video frames; and transmitting, through the plurality of output ports, the synchronized video frames for synchronous display on the at least one display.

In some embodiments, the time interval is between 200 milliseconds to 2 seconds.

In some embodiments, assigning the count value for each video frame of the channel of video signal comprises consecutively assigning a count number to each Vsync signal of each video frame consecutively occurring in each channel in increment of 1, and storing the count number in each video frame as the count value for each video frame.

In some embodiments, the count value for each video frame of a channel may be stored in a shared memory or a preset mapping address.

In some embodiments, the method further comprises performing a self-correction when an abnormal event associated with the display control device occurs, the self-correction comprising determining that the differences between count values of any two video frames recorded during the time interval is larger than 1; determining that a difference between a largest acquisition time and a smallest acquisition time is smaller than one half of time interval between two consecutive video frames, resetting the count value at each channel of the plurality of data acquisition ports before assigning new synchronized count value to each channel.

In some embodiments, the abnormal event associated with the display control device relates to a system rebooting, a cable loosening, a source device rebooting, or a graphics card hibernation.

In some embodiments, there are multiple display queues associated with the at least one display, and the method may further comprises distributing video frames from the channels of video signals into the display queues associated with the at least one display; determining if there is no vacant display queue; if there is no vacant display queue, storing the video frames into a display buffer and vacating their respective display queues; and if there is at least one vacant display queue, assigning the video frames into vacant display queues of a plurality of output ports and repeating the distributing and determining steps.

In some embodiments, the method further comprises determining if the number of stored video frames in each buffer is larger than a preset threshold, if the number of stored video frames in each buffer is larger than or equal to the preset threshold, collecting the count values of the video frames stored in the buffer that are to be sent for display during a display time interval, and if the number of stored video frames in each display queue is less than the preset threshold, storing more video frames in the buffers and repeating the determination step.

In some embodiments, the method may further comprises if a count value of a video frame in a buffer is not the same compared to the rest of the count values of video frames in the buffer, deleting the video frame that has the different count value and collecting a video frame subsequent to the deleted video frame to be submitted together with the rest of the video frames from the rest of the buffer to the at least one display.

In some embodiments, the method may further comprises if all the video frames stored in the display queues have the same count value, submitting all the video frames to the at least one display.

In some embodiments, the display time interval is less than one tenth of a second.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of embodiments. These example embodiments are described in detail with reference to the drawings. The drawings are not to scale. These embodiments are non-limiting example embodiments, in which like reference numerals represent similar structures throughout the several views of the drawings, and wherein:

FIG. 6A is a flow chart of an example process for splicing and displaying a video according to some embodiments of the present disclosure;

DETAILED DESCRIPTION

Figure 1:
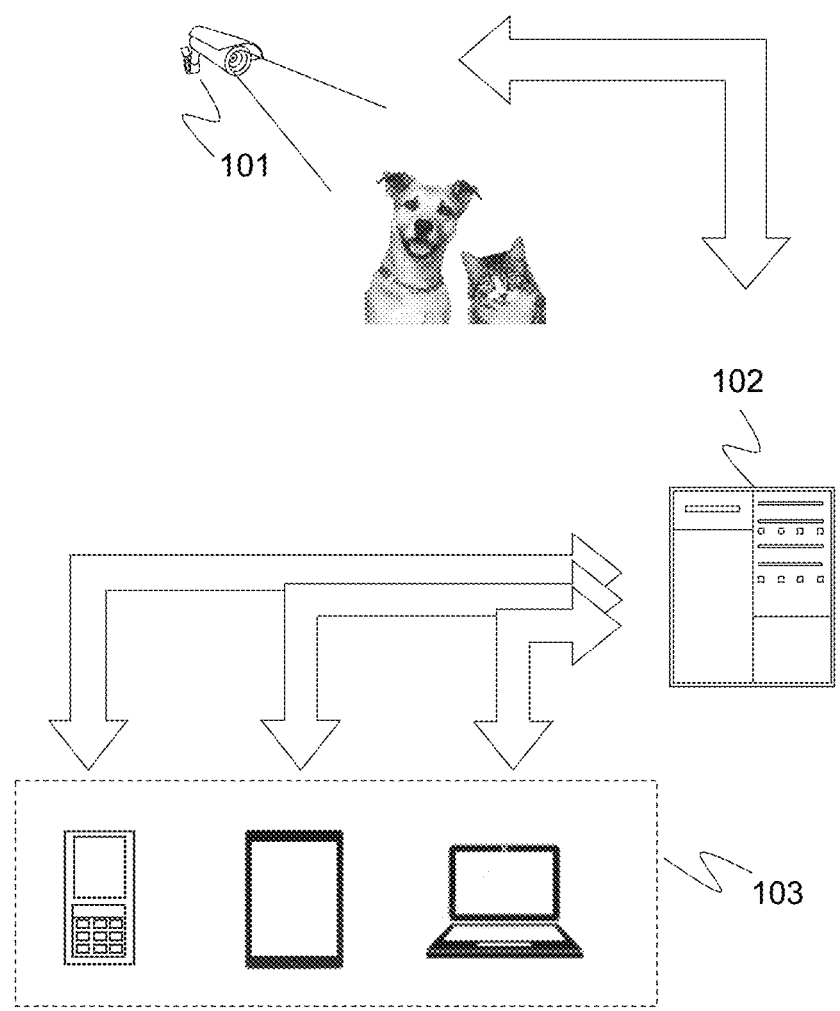
FIG. 1 is a schematic diagram illustrating an example video displaying system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In one aspect, the present disclosure is directed to a device and method for synchronous video display on the at least one display. The device may receive a channel of video signal from each data acquisition port of the plurality of data acquisition ports during a time interval, each channel of video signal comprising a plurality of video frames captured during the time interval, assign a count value for each video frame of the channel of video signal as synchronization information for each video frame of the channel of video signal to form a pool of video frames each corresponding to a count value, select video frames with the same count value from the pool of video frames as synchronized video frames, and transmit, through the plurality of output ports, the synchronized video frames for synchronous display on the at least one display.

FIG. 1 is a schematic diagram illustrating an example video displaying system according to some embodiments of the present disclosure. The video displaying system 100 may be configured to acquire and display a video composed of a plurality of images (also referred to as "video frames"). As shown, the video displaying system 100 may include a video source 101, a display control device 102, and a display terminal 103.

The video source 101 may provide a video for display on the display terminal 103. The video source 101 may generate a video itself or via a video transfer site. For example, the video source 101 may include a camera.

The camera may be able to capture one or more images. As used in this application, an image may be a still image, a video, a stream video, or a video frame obtained from a video. In some embodiments, the camera may be a digital camera, a video camera, a security camera, a web camera, a smartphone, a tablet, a laptop, a video gaming console equipped with a web camera, a camera with multiple lenses, etc.

The camera may include a lens, a shutter, a sensor, a processing device, and a storage device. The lens may be an optical device that focuses a light beam by means of refraction to form an image. In some embodiments, the lens may include one or more lenses. The lens may be configured to intake a scene. An aperture of the lens may refer to the size of the hole through which light passes to reach the sensor. The aperture may be adjustable to adjust the amount of light that passes through the lens. The focal length of the lens may be adjustable to adjust the coverage of the camera.

The shutter may be opened to allow light through the lens when an image is captured. The shutter may be controlled manually or automatically by the processing device.

The sensor may be configured to receive light passing through the lens and transform the light signals of the received light into electrical signals. The sensor may include charge coupled device (CCD) and complementary metal-oxide semiconductor (CMOS). The sensor may be in communication with the logic circuits and may be configured to detect the scene from the lens and transform the scene into electronic signals.

The display control device 102 may include a plurality of data acquisition ports, a plurality of processors, and a plurality of output ports. In some embodiments, each of the plurality of data acquisition ports may correspond to an output port. In some embodiments, each of the plurality of data acquisition ports may correspond to more than one output ports. Each data acquisition port may acquire a channel of video signal from the video source 101. The plurality of processors may connect to each data acquisition port may perform operations such as denoising, scaling, encoding, or the like, on the acquired video signals, and send the processed video signal to the plurality of output ports. The processed video signals output through the plurality of output ports may be spliced to obtain a video. In some embodiments, the display control device 102 may connect one or more display terminals (e.g., at least one display) for display the spliced video. The display control device 102 may connect the one or more display terminals via the plurality of output ports.

In some embodiments, the display control device 102 may be a media server (e.g., a computer or a group of computers). The media server may also include an image and/or video processing electronic device (not shown) configured to process the images and/or video streams obtained from the video source 101 using methods introduced in the present disclosure.

A "video" provided by the video source 101 may be an electronic medium (e.g., a data file, a bit stream, a series of signal) for the recording, copying, playback, broadcasting, and display of moving visual media, such as a TV program, an animation, a movie, a surveillance or monitoring video, a video shared through a social platform, an advertisement, a live show, a video call, a video conference, or the like, or a combination thereof. A video may include a plurality of frames, which may also be referred to as video frames. A frame may be one of a plurality of still images that compose a completer video. By sequentially displaying frames (e.g., images) of a video in a rate (frame rate, such as 24 frames per second (fps), 30 fps, 60 fps, etc.), a screen of the terminal 103 may present the video to a user.

The video frames to be transmitted may be stored in a buffer in the display control device 102 in a form of a video frame buffering queue, which may be managed by a buffer manager. The buffer may use a queue based data structure for buffering the video to be transmitted.

The buffer may be a storage device for buffering the video to be transmitted. The buffer may include a mass storage device, a removable storage device, a volatile read-and-write memory, a read-only memory (ROM), or the like, or any combination thereof. Example mass storage may include a magnetic disk, an optical disk, a solid-state drive, etc. Example removable storage may include a flash drive, a floppy disk, an optical disk, a memory card, a zip disk, a magnetic tape, etc. Example volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Example ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The display terminal 103 may receive the transmitted video. In some embodiments, the display terminal 103 may decode (e.g., through a video player installed on the display terminal 103) the transmitted video or video frames using a decoding algorithm and display the video to a user.

The display terminal 103 may be various in forms. For example, the display terminal 103 may include a mobile device, a tablet computer, a physical display screen (e.g., an LCD, an electronic ink display (E-Ink), curved screen, a television device, a touch screen, etc.), or the like, or any combination thereof. In some embodiments, the mobile device may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc.

Figure 2:
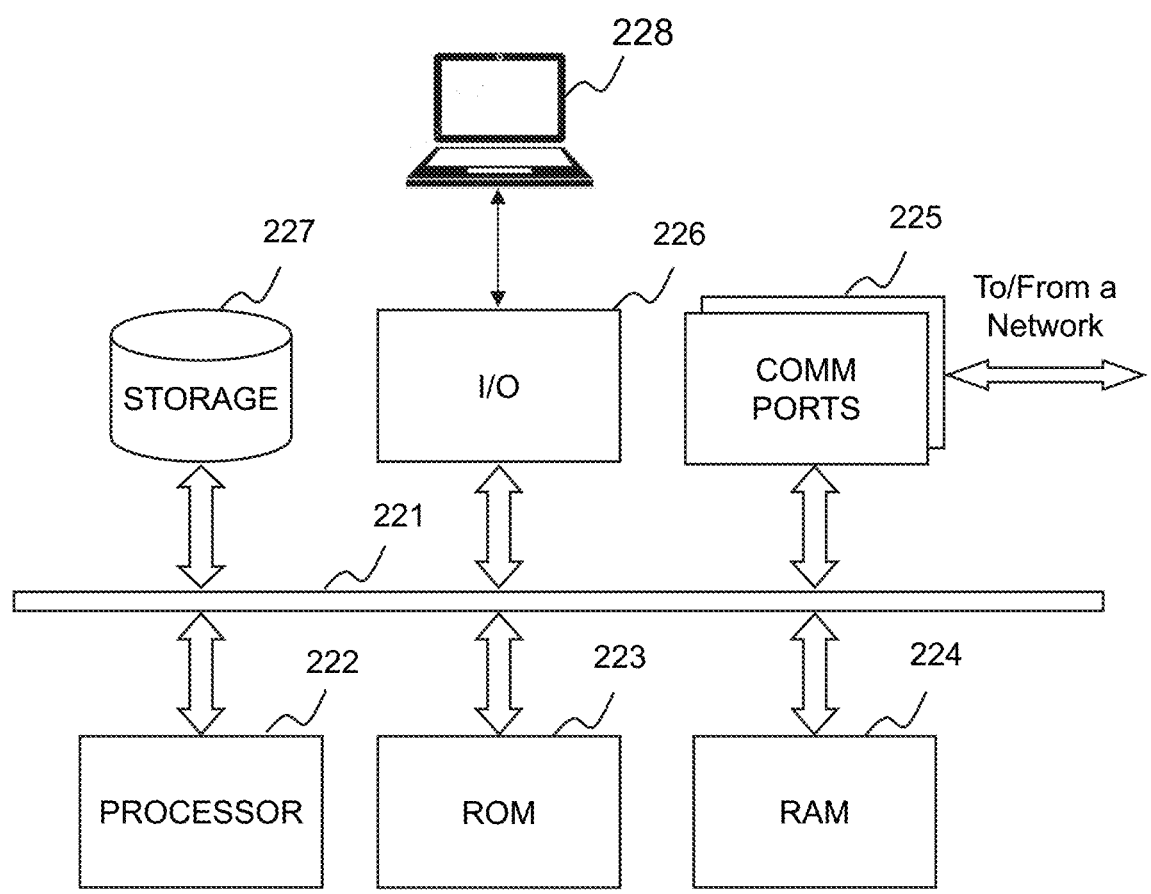
FIG. 2 is a schematic diagram illustrating example hardware and optionally software components of an example computing device according to some embodiments of the present disclosure.

FIG. 2 is a schematic diagram illustrating example hardware and/or software components of an example computing device according to some embodiments of the present disclosure. For example, the computing device 200 may be the display control device or a part of it. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information obtained from the video source 101, the display control device 102, and/or the display terminal 103. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform example methods described in the present disclosure. For example, the storage 222 may store a program for the processing engine (e.g., the server 103) for determining a regularization item.

The I/O 226 may input and/or output signals, data, information, etc. In some embodiments, the I/O 226 may include one or more input ports and one or more output ports. The one or more input ports (also referred to as data acquisition port) may be configured to acquire data/information, such as a channel of video signal. The one or more output ports may be configured to output data/information, such as videos to be spliced or a spliced video.

The communication port 225 may be connected to a network to facilitate data communications. The communication port 225 may establish connections between the video source 101, the display control device 102, and/or the display terminal 103. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 225 may be and/or include a standardized communication port, such as RS232, RS485, etc. In some embodiments, the communication port 225 may be a specially designed communication port.

Figure 3:
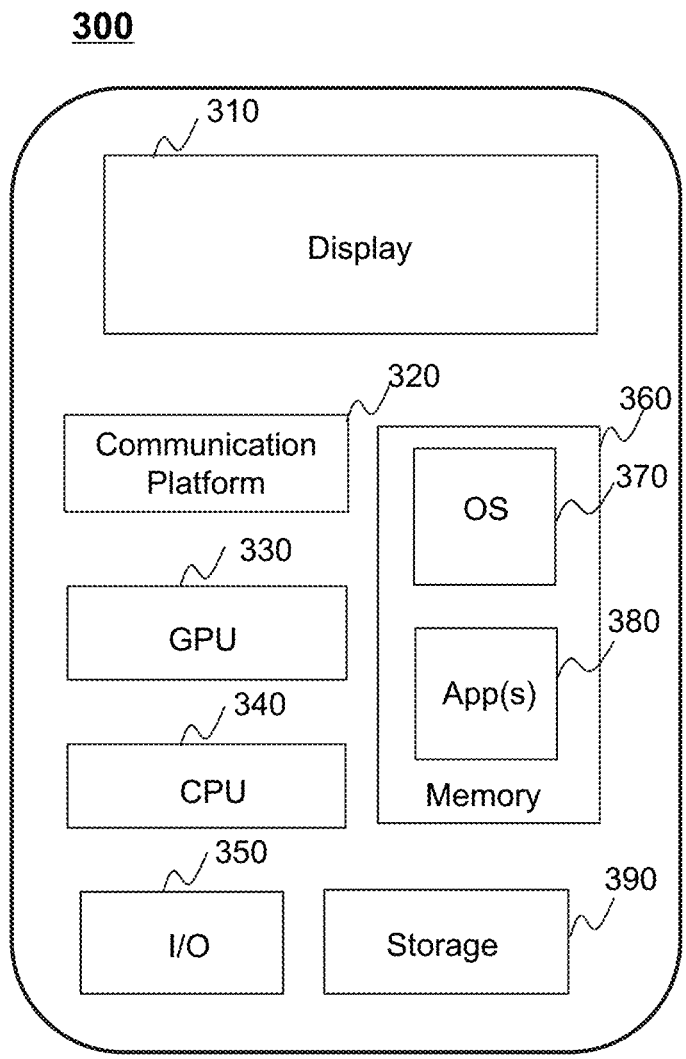
FIG. 3 is a schematic diagram illustrating example components of an example user device according to some embodiments of the present disclosure.

FIG. 3 is a schematic diagram illustrating example components of an example user device according to some embodiments of the present disclosure. As illustrated in FIG. 3, the user device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the display terminal 103. The applications 380 may include a video player for receiving a video provided by the video source 101 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
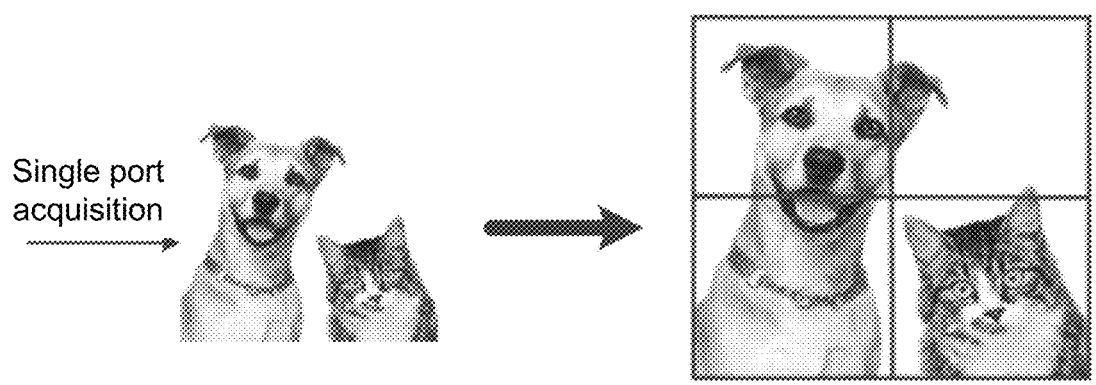
FIG. 4 illustrates the process of image acquisition and display using a conventional display control device that acquires only one channel of video signal through a single data acquisition port and displays a spliced video transmitted through a plurality of output ports.

FIG. 4 illustrates a schematic diagram of a conventional display control device that acquires only one channel of video signal through a single data acquisition port and displays a spliced video transmitted through a plurality of output ports according to some embodiments of the present disclosure. The conventional display control device may acquire a channel of video signal through a single data acquisition port, perform processing operations such as mapping, scaling, etc., on the acquired channel of video signal, and output a processed video through a plurality of output ports. The plurality of output ports may splice the processed channel of video signal and display a spliced video. Generally, only one channel of video signal with a higher resolution may be acquired through the single data acquisition port so as to obtain a high resolution video. However, since the displayed video is spliced with the channel of video signal by the plurality of output port, the resolution of the displayed video may be a ratio of the resolution of the channel of the video signal to the number of output ports. For example, taking a display control device displaying a video through four output ports as an example, if the resolution of the channel of video signal acquired from the data acquisition port is 1080P, i.e., 1920×1080 pixels, the resolution of the video output by each output port of the four output ports may be ¼ of the originally acquired channel of video signal, i.e., 960×540 pixels, which is dramatically reduced.

In order to display a high resolution video, the conventional display control device in the prior art may acquire only one channel of video signal with a higher resolution through a single port (i.e., a single data acquisition port). However, the channel of video signal with a higher resolution may not be acquired due to limitations of hardware resources of the channel of video signal with a higher resolution display control device. The resolution of the displayed video may not be high enough or even blurry. Thus, embodiments in the present disclosure may provide a video splicing and displaying method as well as a display control device for improving the resolution of the spliced video output by the display control device.

The video splicing and displaying method provided according to the embodiments of the present disclosure may be applied to the display control device. The display control device may execute program codes implementing the video splicing and displaying method provided by the embodiments of the present disclosure, and implement the video splicing and displaying according to the method.

Technical solution provided in embodiments of the present disclosure may be described below with reference to the following figures.

Figure 5:
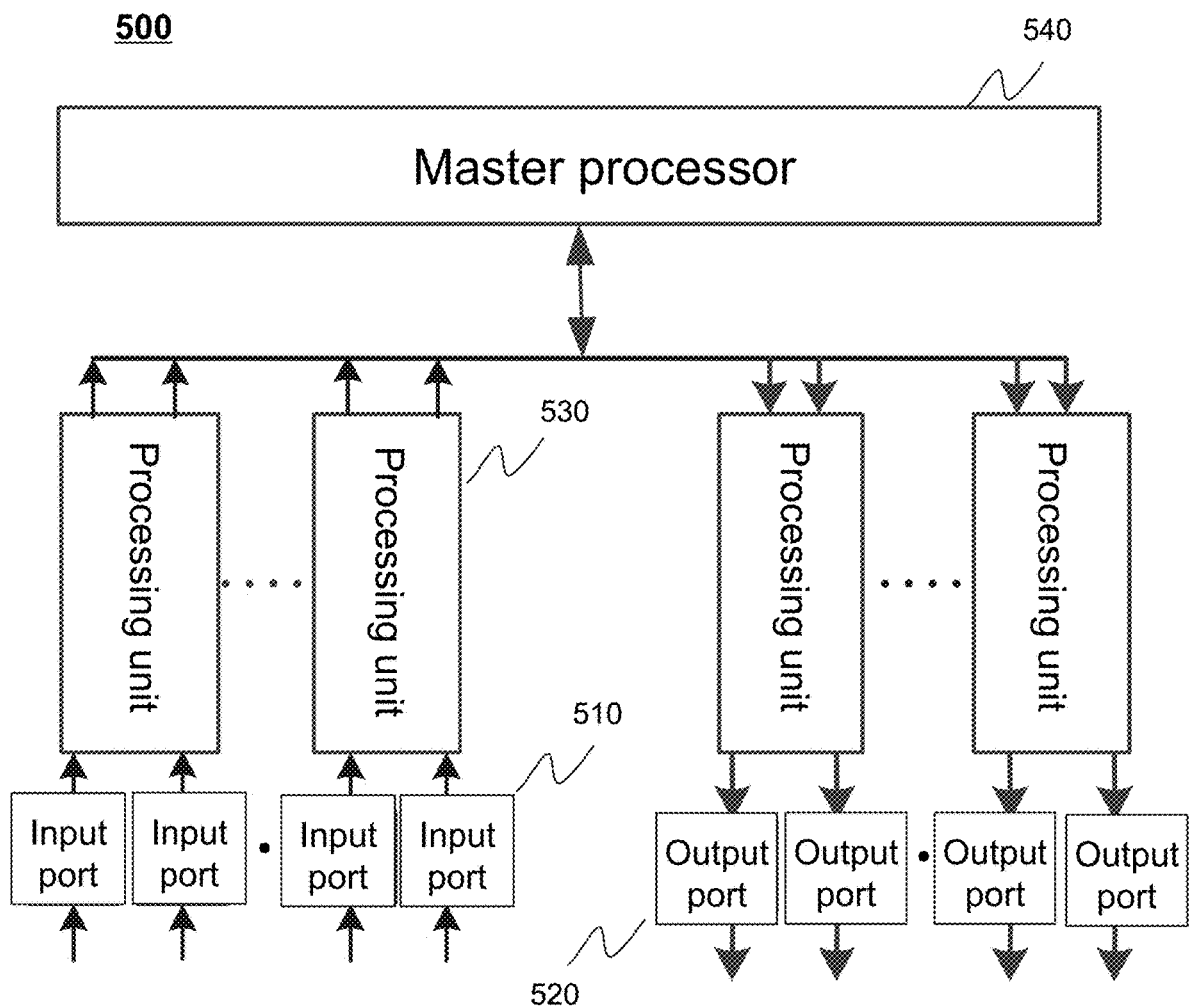
FIG. 5 is a schematic diagram of a display control device according to some embodiments of the present disclosure, illustrating multiple data acquisition or input ports and multiple output ports.

FIG. 5 illustrates a schematic diagram of a display control device 500 according to some embodiments of the present disclosure. As shown in FIG. 5, the display control device may include a plurality of data acquisition ports 510, a plurality of output ports 520, a plurality of processing units 530, and a master processor 540. In some embodiments, the master processor 540 may include a master acquisition control and a master display control (not shown in the figure). The master acquisition control may control the plurality of acquisition ports. The master display control may control the plurality of output ports. The master processor 540 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. In some embodiments, the master acquisition control and/or the master display control may also be processors listed above.

In some embodiments, each of the plurality of data acquisition ports 510 may correspond to an output port. In some embodiments, each of the plurality of data acquisition ports 510 may correspond to more than one output ports. Each data acquisition port may acquire a channel of video signal. A processing unit connecting to each data acquisition port may perform operations such as scaling, encoding, or the like, on the acquired video signal, and send the processed video signal to the master processor. The master processor 540 may obtain a plurality of channels of video signals, send the received channels of video signals to the plurality of output ports 520, splice the plurality of channels of video signals output through each output port to obtain a video, and control one or more display terminals (e.g., at least one display) of the display control device to display the spliced video. In some embodiments, a processing unit in the display control device may be a system-level chip, such as a system on chip (SoC), set in the display control device. The master processor may be a CPU set in the display control device. The connection between the processing units and the master processor may be a wired connection, a wireless connection, any other communication connection that can enable data transmission and/or reception, and/or any combination of these connections. The wired connection may include, for example, a peripheral component interconnect express (PCIE), an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof.

In some embodiments, the master processor 540 of the display control device 500 may include an acquisition unit and an output unit. The acquisition unit may be configured to perform operations in 610 illustrated in FIG. 6 in which a channel of video signal may be received from each data acquisition port of the plurality of data acquisition ports 510 of the display control device, and synchronization information of the each channel of video signal may be stored, wherein the synchronization information includes count values of video frames in each channel of video signal, and two video frames having a same count value correspond to a same displaying time (i.e., the video frames having a same count value may be spliced and displayed in one scene of a displayed video). The output unit may be configured perform operations in 620 illustrated in FIG. 6, in which the plurality of channels of video signals may be transmitted for synchronous display on at least one display according to the synchronization information of each channel of video signals through the plurality of output ports 520. In some embodiments, the acquisition unit may include the plurality of data acquisition ports of the display control device, and the output unit may include the master processor of the display control device.

In some embodiments, the output unit may further be configured to buffer the plurality of channels of video signals to multiple display queues of the at least one display terminal. During the data buffering process, after all vacant display queues of the multiple display queues of the at least one display terminal are occupied, the multiple display queues may be cleared up by deleting video frames stored in the occupied display queues. If there is no vacant display queue, the output unit may store the video frames into a display buffer and vacate their respective display queues; if there is at least one vacant display queue, the output unit may assign the obtained video frames into vacant display queues of the plurality of output ports, such that the video frames buffered in the multiple display queues may be synchronized.

In some embodiments, the output unit may further be configured to select video frames from the plurality of channels of video signals having the same count value of Vsync signal (i.e., the same synchronization information) as synchronized video frames, and send the selected video frames and the corresponding synchronization information to the at least one display terminal at the same time.

In some embodiments, the output unit may further be configured to determine whether the number of video frames buffered in the display queues is greater than a preset threshold before the buffered video frames are sent the video to the at least one display terminal. If the number of the buffered video frames is greater than the preset threshold, at least one synchronized video frame may be selected from each of the plurality of channels of video signals, so as to enable the video frames to reach the at least one display terminal at almost a same time.

The display control device may further include a resetting unit. The resetting unit may be configured to acquire the count value of Vsync signal corresponding to each of the plurality of data acquisition ports periodically, and determine whether the count values of Vsync signal corresponding to the plurality of data acquisition ports are the same.

If the count values of Vsync signal are not the same, it may indicate that an abnormal event may occur, which causes a delay of one or more channels of video signals. For example, if two count values of Vsync signal obtained have a difference of a value larger than 0, it may indicate that the transmission of a channel of video signal has a delay. The resetting unit may generate a resetting instruction that instructs all of the plurality of data acquisition ports to recount the Vsync signal from 0, and send the resetting instruction to the plurality of data acquisition ports so as to notify the plurality of data acquisition ports to recount the Vsync signal from 0, which may calibrate the delay caused by an abnormal event.

In some embodiments, the resetting unit may further be configured to retrieve the count value of Vsync signal corresponding to each of the plurality of data acquisition ports from a shared memory or a preset address periodically. The plurality of data acquisition ports may store the plurality of channels of video signals and the corresponding synchronization information to the shared memory or the preset address.

In some embodiments, the display control device may be a client device. The display control device may include at least one processor and a memory. The at least one processor may be configured to perform example operations of the video splicing and displaying method described in the present disclosure when computer programs stored in the memory are executed.

In some embodiments, the processor may be a central processor, an application specific integrated circuit (ASIC), one or more integrated circuits, or the like, or any combination thereof.

The memory may connect to the at least one processor. The memory may include a Read Only Memory (ROM), a Random Access Memory, (RAM), a disk storage, or the like. The memory may be configured to store data executed by the processor to implement example methods or processes in the present disclosure. In some embodiments, the display control device may include more than one memory. The memory may not be a mandatory part of the display control device, thus being shown in dotted lines in FIG. 10. In some embodiments, the processor may be a physical device with functions of the acquisition unit and/or the output unit.

FIG. 6A is a flow chart of an example process for splicing and displaying a video according to some embodiments of the present disclosure. In some embodiments, the process 600 may be implemented on the video displaying system 100 as illustrated in FIG. 1. For example, the process 600 may be stored in a storage medium (e.g., the storage 227 of the computing device 228) as a form of instructions, and invoked and/or executed by the display control device as illustrated in FIG. 5. The operations in the process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6A and described below may not be intended to be limiting. Referring to FIG. 6A, the video splicing and displaying method may be described in detail below in combination with FIGS. 5 and 6A.

In 610, a channel of video signal may be received from each data acquisition port of the plurality of data acquisition ports of the display control device, and synchronization information of the each channel of video signal may be stored, wherein the synchronization information includes count values of video frames in each channel of video signal such that two video frames having same count values correspond to a same displaying time.

In 620, the plurality of channels of video signals may be transmitted for synchronous display on at least one display according to the synchronization information of each channel of video signals.

As for 610, the master processor of the display control device may control the plurality of data acquisition ports to acquire a plurality of channels of video signals from one or more video sources during a time interval. Each channel of video signal may include a plurality of video frames captured during the time interval. In some embodiments, the time interval may be set by a user, according to default settings of the display control device, etc. In some embodiments, the time interval may be 100 milliseconds-3 seconds. In some embodiments, the time interval may be 200 milliseconds-2 seconds. In some embodiments, the time interval may be 200-400 milliseconds, 400-600 milliseconds, . . . , 1.8-2 seconds, etc. For example, the time interval may be between 2 seconds. In some embodiments, a data acquisition port may acquire a channel of video signal. In some embodiments, the plurality of data acquisition ports may correspond to a video generating terminal (i.e., a video source such as an optical camera), and acquire the plurality of channels of video signals from the video generating terminal. In some embodiments, the plurality of data acquisition ports may correspond to a plurality of video generating terminals, and each data acquisition port may acquire a channel of video signal from a video generating terminal connected to the data acquisition port. After the plurality of data acquisition ports acquire the plurality of channels of video signals, the plurality of channels of video signals may be output to the plurality of output ports of the display control device. The plurality of output ports may connect to at least one display terminal, and the display control device may splice the plurality of channels of video signals output by the plurality of output ports, and control the synchronous display of the spliced video on the at least one display terminal.

Since the embodiments of the present disclosure describe the display control device splicing and synchronously displaying a plurality of channels of video signals, an interrupt service program may be provided to facilitate an accurate synchronous display. A channel of video signal may include a plurality of video frames. When a data acquisition port acquires a video frame, an interrupt of a Vsync signal may be triggered, and the interrupt service program may generate a count value for the Vsync signal interrupt. As used herein, the Vsync signal may be a signal for synchronizing video frames in the acquisition process of a channel of video signal. In some embodiments, the count values for the Vsync signal interrupt may be integers. The interrupt service program may count the number of Vsync signal interrupts, and generate the count values accordingly. For example, after a data acquisition port acquires a first video frame, the count value of Vsync signal may be 1. If the data acquisition port acquires a second video frame, the count value of Vsync signal may be 2. The count values of the Vsync signal may be defined as the synchronization information of a channel of video signal.

In some embodiments, a count value for each video frame of the channel of video signal may be assigned as synchronization information for each video frame of the channel of video signal to form a pool of video frames each corresponding to a count value. In some embodiments, to assign the count value for each video frame of the channel of video signal, the display control device may consecutively assign a count number to each Vsync signal of each video frame consecutively occurring in each channel in increment of 1, and store the count number in each video frame as the count value for each video frame.

In some embodiments, the plurality of data acquisition ports may record the count value of Vsync signal separately when the plurality of channels of video signals are acquired. If count values of two video frames are the same, it may indicate that the two video frames are acquired at the same displaying time (i.e., the video frames having the same count value may be spliced and displayed in one scene of a displayed video). The display control device may select video frames with the same count value from the pool of video frames as synchronized video frames. The synchronized video frames may be transmitted, through the plurality of output ports, for synchronous display on the at least one display.

The plurality of data acquisition ports may send the plurality of channels of video signals and corresponding synchronization information to the master processor. The master processor may send the plurality of channels of video signals to the plurality of output ports. In some embodiments, each channel of video signal may be sent to an output port by the master processor. In some embodiments, each channel of video signal may be sent to a plurality of output ports. As for 620, the at least one display terminal connected to the plurality of output ports may be controlled to synchronously display the plurality of channels of video signals according to the synchronization information.

Abnormal events associated with the device that generates a video source may occur. The abnormal events may include or relates to a system rebooting, a cable (e.g., a cable connecting the device for generating video sources and the display control device) loosening, a source device rebooting, or a graphics card hibernation, or the like, or any combination thereof. An abnormal event may cause a delay of one of more channels of video signals such that the acquisition time of the plurality of channels of video signals may also vary. The count value of Vsync signal for each data acquisition port may be different, which results in different count values of Vsync signal corresponding to video frames to be spliced and displayed in one scene of a displayed video. Obviously, the video frames displayed according to the count values of Vsync signal (i.e., synchronization information) may be asynchronous. In order to address this problem, the present disclosure also provides a method for calibrating the count values of Vsync signal.

Figure 6B:
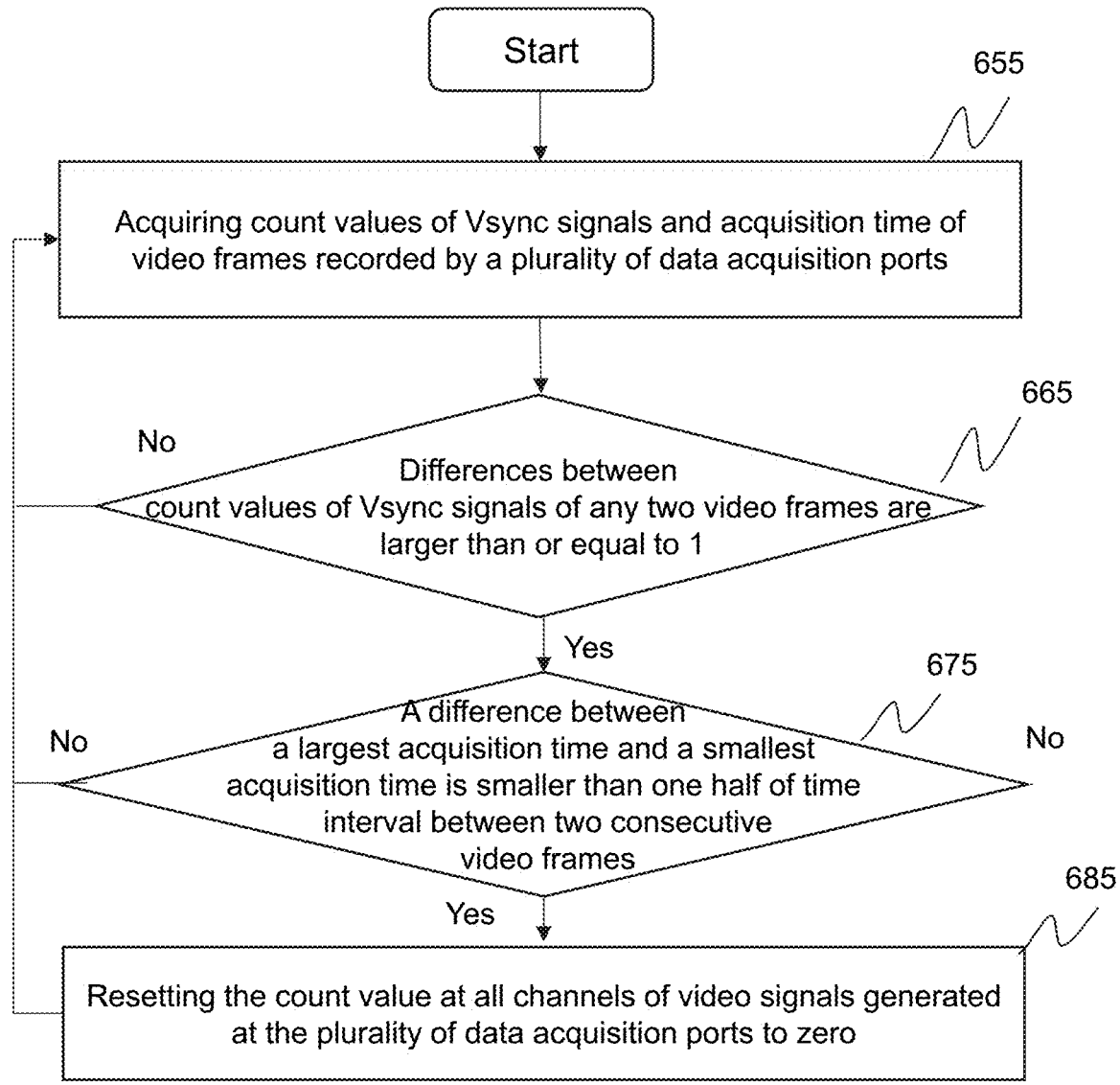
FIG. 6B is a flow chart of an example process for calibrating the count values of Vsync signals generated by the plurality of data acquisition ports according to some embodiments of the present disclosure.

FIG. 6B is a flow chart of an example process for calibrating the count values of Vsync signal corresponding to the plurality of data acquisition ports according to some embodiments of the present disclosure.

In 655, count values of Vsync signals and acquisition time of video frames recorded by a plurality of data acquisition ports may be acquired.

In 665, a determination as to whether differences between count values of Vsync signals of any two video frames are larger than or equal to 1. If a difference between count values of two Vsync signals is larger than or equal to 1, the process 650 may proceed to 675 to determine if a difference between a largest acquisition time and a smallest acquisition time is smaller than one half of time interval between two consecutive video frames. Otherwise, the process 650 may proceed to 655 to start a next round to acquire count values of Vsync signals and acquisition time of another set of video frames recorded by a plurality of data acquisition ports.

In 675, a determination as to whether a difference between a largest acquisition time and a smallest acquisition time is smaller than one half of time interval between two consecutive video frames. If the time difference between the largest acquisition time and the smallest acquisition time is smaller than one half of time interval between two consecutive video frames, the process 650 may proceed to 685 to reset the count value at all channels of video signals generated at the plurality of data acquisition ports to zero. Otherwise, the process 650 may also proceed to 655 to start a next round to acquire count values of Vsync signals and acquisition time of another set of video frames recorded by a plurality of data acquisition ports.

In some embodiments, the master processor may acquire the count value of Vsync signal corresponding to a video frame acquired from each of the plurality of data acquisition ports in real-time, and determine whether the count values of Vsync signal corresponding to the video frames acquired from the plurality of data acquisition ports are the same.

In some embodiments, the video frames may be acquired in different manners. Merely for illustration purposes, if the video frames are acquired in a manner without latency, the video frames may correspond to almost the same acquisition time. If the video frames are acquired periodically according to timers in the processing units, the acquisition time of the video frames to be spliced and displayed as a scene of a displayed video may vary from each other. For example, a first video frame may be acquired at 0.1 milliseconds, and a second video frame may be acquired at 0.7 milliseconds, and a third video frame may be acquired at 1.1 milliseconds. In some embodiments, the acquisition time of the video frames may be synchronized by the master processor 540 to the processing units 530. For example, the master processor 540 may synchronize time to the processing units 530 in real-time. Each video frame may correspond to an acquisition time.

If the count values of Vsync signal corresponding to video frames acquired from the plurality of data acquisition ports are the same, it may indicate that there is no delay (e.g., caused by abnormal events) in any of the plurality of channels of video signals. At this time, the master processor may keep monitoring the count values of Vsync signal corresponding to video frames acquired from the plurality of data acquisition ports in real-time. If the count values of Vsync signal are not the same, it may indicate that an abnormal event may occur, which causes a delay of one or more channels of video signals. For example, if two count values of Vsync signal obtained have a difference of a value larger than or equal to 1, it may indicate that the transmission of a channel of video signal has a delay due to an abnormal event. In some embodiments, the master processor may keep monitoring the acquisition time of video frames and determine whether a difference between a largest acquisition time and a smallest acquisition time is smaller than one half of time interval between two consecutive video frames (or one half of a period of each timer). In some embodiments, the master processor 540 may synchronize time to the processing units 530 at a regular time interval of, for example, 1 millisecond. When video frames are acquired, the acquisition time of the video frames may be sent to the master processor 540 in real-time. The master processor 540 may determine whether the acquired video frames are synchronous based on the acquisition time of the video frames. Merely by ways of example, if the plurality of data acquisition ports acquires a plurality of channel of video signals having a frame rate of 60 Hz, time intervals between two consecutive video frames of each channel of video signals may be 16.7 milliseconds. The master processor 540 may determine whether the acquired video frames are synchronous according to a difference between a largest acquisition time and a smallest acquisition time. In some embodiments, if the difference between the largest acquisition time and the smallest acquisition time is smaller than one half of time interval between two consecutive video frames, the master processor 540 may determine that the acquired video frames are synchronous. For example, for video signals having a frame rate of 60 Hz, time intervals between two consecutive video frames of each channel of video signals may be 16.7 milliseconds. If the difference between the largest acquisition time and the smallest acquisition time is smaller than 8 milliseconds, the video frames may be determined as synchronous. Otherwise, the video frames may be determined as asynchronous, which may indicate an abnormal event.

If it is determined that the acquired video frames are synchronous, a self-correction may be performed. The master processor may generate a resetting instruction that instructs all of the plurality of data acquisition ports to recount the Vsync signal from 0, and send the resetting instruction to the processing units so as to notify the plurality of data acquisition ports to recount the Vsync signal from 0, which may calibrate the delay caused by an abnormal event.

It should be noted that during an acquisition process of a channel of video signal through each data acquisition port, time intervals between any two consecutive video frames may be short. For example, if a data acquisition port acquires a channel of video signal having a frame rate of 60 Hz, time intervals between two consecutive video frames may be 16.7 milliseconds. Hence, an acquisition delay for acquiring the video frame and other information related to the video frame should be 8 milliseconds or less. The higher the frame rate of the channel of video signal is, the lower the delay for acquiring the video frame and other information related to the video frame should be. Therefore, the master processor may acquire the count value of Vsync signal corresponding to each of the plurality of data acquisition ports periodically in a low latency manner. For example, the master processor may retrieve the count value of Vsync signal corresponding to each of the plurality of data acquisition ports from a shared memory or a preset address periodically. In some embodiments, before the control unit retrieves the count value, the plurality of data acquisition ports may save the synchronization information contained in the read video signal to the shared memory or the preset address. In this way, the count value of Vsync signal may be obtained in a shorter time by retrieving from the shared memory or the preset address, and the time to reset the count value of Vsync signal corresponding to the plurality of data acquisition ports may be more accurate relative to another mechanism of sending and receiving messages.

In some embodiments, after the at least one display terminal of the display control device receives the plurality of channels of video signals, the plurality of channels of video signals may be buffered. Specifically, each output port may send video frames included in one or more channels of video signals to one or more of the at least one display terminal successively, such that the plurality of output ports may buffer the plurality of channels of video signals to multiple display queues of the at least one display terminal. In another word, video frames from the channels of video signals may be distributed into the display queues associated with the at least one display. In some embodiments, each of the at least one display may correspond to a display queue. When the plurality of channels of video signals are sent through the plurality of output port, the time at which a first video frame in a video transmitted through each output port reaches a display queue of the at least one display terminal may be different. If the at least one display terminal buffers the received video frames directly, it is possible that video frames buffered earlier may not be synchronous with video frames buffered later. During the buffering process, after all vacant display queues of the multiple display queues of the at least one display terminal is occupied, the multiple display queues may be cleared up by deleting video frames stored in the occupied display queues. If there is no vacant display queue, the display control device may store the video frames into a display buffer and vacate their respective display queues; if there is at least one vacant display queue, the display control device may assign the obtained video frames into vacant display queues of the plurality of output ports, such that the video frames buffered in the multiple display queues may be synchronized, such that the video frames buffered in the multiple display queues may be synchronized. In another word, the display control device may delete all video frames in the display queues and repeat the distributing and determining operations.

Since the display queues buffers more than one video frame, the at least one display terminal may not identify synchronized video frames from the more than one video frame. The display control device may select video frames from the plurality of channels of video signals having the same count value of Vsync signal (i.e., the same synchronization information) as synchronized video frames, and send the selected video frames and the corresponding synchronization information to the at least one display terminal at the same time. In this way, the at least one display terminal may synchronously display of the video frames according to the synchronization information. In some embodiments, the master processor may acquire synchronization information (i.e., count value of Vsync signal) of video frames to be buffered in the display queues periodically. A determination may be made as to whether differences between count values of Vsync signals of any two video frames are the same. In another word, differences between count values of Vsync signals of any two video frames may be obtained, and the obtained differences may be compared with each other. For example, five video frames may be buffered in the multiple display queues, and the display control device may determine whether differences of count values of Vsync signals of any two of the five video frames are the same. If the differences are not the same, a display queue storing a video frame corresponding to a minimum count value of Vsync signal may be notified to delete the video frame corresponding to the minimum count value of Vsync signal from the display queue, and send a next video frame to the display queue. The next video frame in the display queues may be transmitted together with video frames in the forefront of other display queues to the at least one display. If the differences are the same (i.e., the count values of Vsync signals of all video frames are the same), the video frames may be synchronized and sent to the display queues directly.

In some embodiments, the display control device may collect the count values of the video frames stored in the display queues that are to be sent for display during a queue time interval. If a count value of a video frame in a displaying queues is not the same compared to the rest of the count values of video frames in the rest of the displaying queues, the display control device may delete the video frame that has the different count value and collect a video frame subsequent to the deleted video frame to be submitted together with the rest of the video frames from the rest of the display queues to the at least one display. If all the video frames stored in the display queues have the same count value, the display control device may submit all the video frames to the at least one display. In some embodiments, the queue time interval may be set by a user, according to default settings of the display control device, etc. In some embodiments, the queue time interval may be less than 1 tenth of a second.

Since if the video frames in the display queues are sent to the display terminal directly, the time at which the video frames arrive at the display terminal may also be different. Therefore, the display control device may determine whether the number of video frames buffered in the display queues is greater than a preset threshold before the buffered video frames are sent the video to the at least one display terminal. If the number of the buffered video frames is greater than the preset threshold, at least one synchronized video frame may be selected from each of the plurality of channels of video signals, so as to enable the video frames to reach the at least one display terminal at almost a same time. In this way, the phenomenon of blurred screen occurred when the synchronized video frames arriving at the at least one display terminal at different time are spliced may be eliminated. The preset threshold may be set by a user, according to default settings of the display control device. In some embodiments, the preset threshold may be set according to an empirical value. For example, the preset threshold may be 6, or a value measured according to an experiment, which is not limited in the present disclosure.

In some embodiments, the display control device may determine if the number of stored video frames in the display queues is larger than a preset threshold. If the number of stored video frames in the display queues is larger than or equal to the preset threshold, the display control device may select video frames having the same count value as synchronized video frames for synchronous display on the at least one display. If the number of stored video frames in the display queues is less than the preset threshold, the display control device waits for more video frames being stored in the display queues and repeat the determination operation on whether the number of stored video frames in each display queue is larger than the preset threshold.

In some embodiments, a video frames in a video stream output through each output port may arrive at the at least one display in almost a same time (i.e., small delay) so as to be spliced into a complete video. Otherwise, the volume of the buffer and the number of buffered video frame may need to be increased, which results in a wasting of resources. In order to minimize the delay, the master processor may take manners with low latency as mentioned above when the video frames are buffered to the at least one display terminal, for example, retrieve from a shared memory, or read from a preset address.

Before the synchronized video frames in the display queues are synchronously displayed on the at least one display terminal, the at least one display terminal may perform video matting operations on corresponding positions of the video frames according to coordinate information sent by the master processor, perform a zooming operation, then input into physical display screens of the at least one display terminal. The at least one display terminal may send the matted and scaled video frames to corresponding display screens or display portions according to the number of display screens or display portions included in the at least one display terminal.

In summary, according to the video splicing and displaying method provided in the present disclosure, a channel of video signal may be acquired by a plurality of data acquisition ports and output to a plurality of output ports, and the count value of Vsync signal may be used as synchronization information of the channel of video signal. Since multi-ports acquisition is used, a video with a higher resolution may be obtained compared with the single-port acquisition in the prior art. The count value of Vsync signal used as the synchronization information of the video signal for display control may facilitate a synchronous display of the video signal as well as the high resolution.

In single port acquisition, the data acquisition port may not be able to acquire or process a high resolution video due to limitations of hardware and/or software resources, thus resulting in a low resolution video spliced by video signals output from multiple output ports. On contrary, the video splicing and displaying method provided in the present disclosure may improve the resolution of the displayed video which is limited by the resolution of the video signal originally acquired by one data acquisition port and make it possible to obtain a high resolution video using image splicing and image fusion.

The display control device in the present disclosure may use a count value of Vsync signal as synchronization information of a video signal. Since an interrupt of the Vsync signal is triggered when a data acquisition port acquires a video frame, the Vsync signal may be more accurate in comparison with time stamp information used as synchronization information in the prior art, such that the synchronous display effect may be better.

Abnormal events such as a system rebooting, a cable loosening, a source device rebooting, or a graphics card hibernation may cause a delay of the transmission of a video signal in the prior art. An abnormal event may result in different count values of Vsync signal corresponding to video frames to be spliced and displayed at a same time according to some embodiments of the present disclosure. Obviously, the display of multiple channels of video signals may be asynchronous if the count values of Vsync signal under an abnormal event are used as synchronization information. Therefore, the display control device in the present disclosure may reset the plurality of data acquisition ports such that the count values of Vsync signal corresponding to the plurality of data acquisition ports may restart from 0 when video frames to be spliced and displayed at a same time correspond to different count values of Vsync signal, thus avoiding the problem of asynchronously display of the plurality of channels of video signals caused by a delay of one or more channels of video signals under an abnormal event such as system rebooting, system standby, etc.

Generally, time intervals between any two consecutive video frames may be short when each of the plurality of video acquisition ports acquires a channel of video signal. In order to improve the accuracy of the synchronous display, the master processor may acquire the count value of Vsync signal with a low latency manner. In another word, the count value of the Vsync signal corresponding to each of the plurality of data acquisition ports may be obtained from a shared memory or a preset address. The manner to retrieve the count value of Vsync signal from the shared memory or the preset address may reduce the time to be consumed and provide a more accurate timing for resetting in relative to other manners such as receiving and sending messages.

In some embodiments, the process 650 may include a plurality of cycles. Video frames acquired in each cycle may be spliced and displayed as one scene in the displayed video if the video frames are synchronized video frames.

Figure 7:
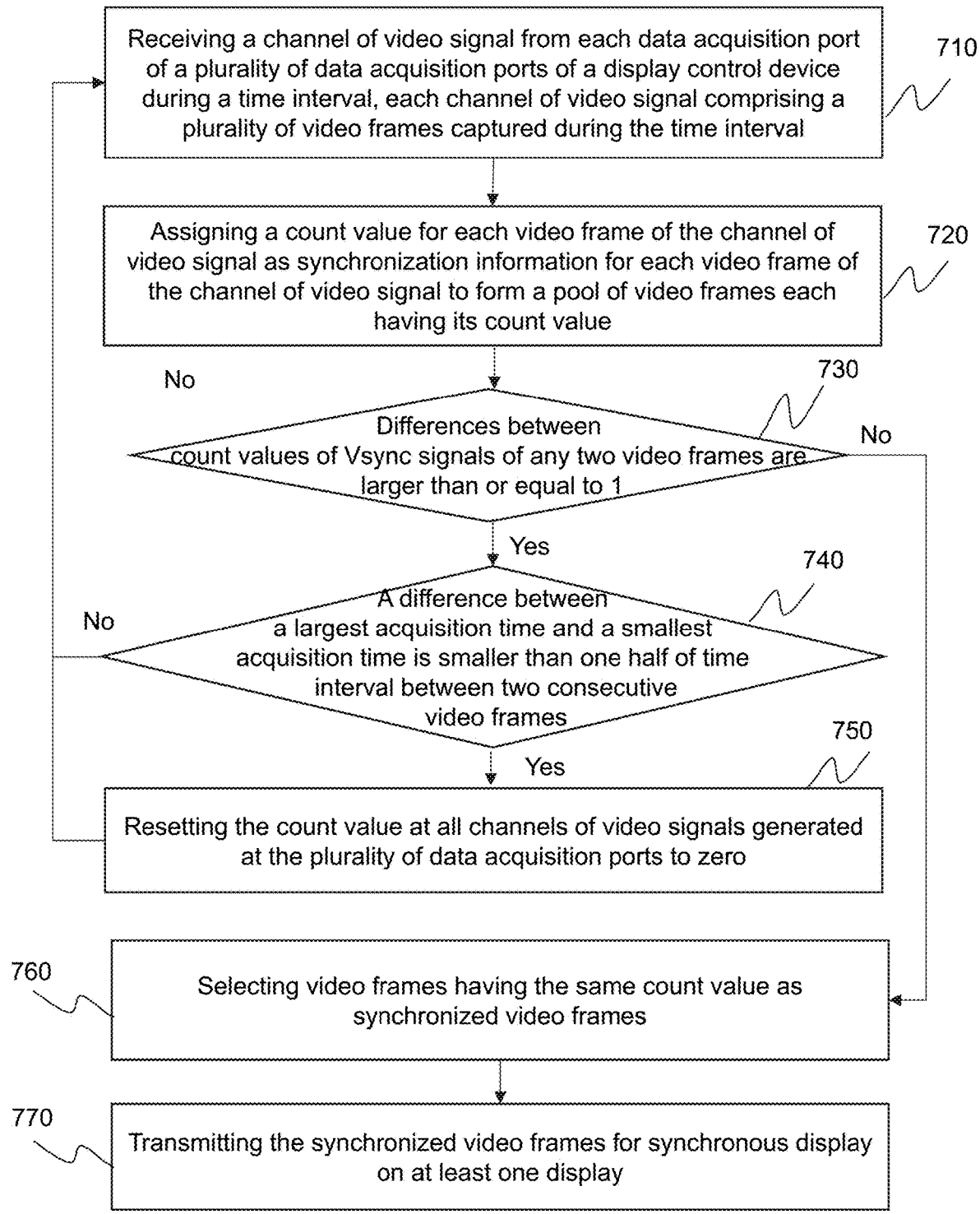
FIG. 7 is a flow chart illustrating an example process for splicing and displaying a video according to some embodiments of the present disclosure.

FIG. 7 is a flow chart of an example process for splicing and displaying a video according to some embodiments of the present disclosure. In some embodiments, the process 700 may be a combined process of the process 600 and the process 650.

In 710, the display control device may receive a channel of video signal from each data acquisition port of a plurality of data acquisition ports of a display control device during a time interval, each channel of video signal comprising a plurality of video frames captured during the time interval.

Each channel of video signal may include a plurality of video frames captured during the time interval. In some embodiments, the time interval may be set by a user, according to default settings of the display control device, etc. Merely by ways of example, the time interval may be between 2 seconds. In some embodiments, a data acquisition port may acquire a channel of video signal. In some embodiments, the plurality of data acquisition ports may correspond to a video source (e.g., an optical camera). In some embodiments, the plurality of data acquisition ports may correspond to a plurality of video sources, and each data acquisition port may acquire a channel of video signal from a video source connected to the data acquisition port.

In 720, the display control device may assign a count value for each video frame of the channel of video signal as synchronization information for each video frame of the channel of video signal to form a pool of video frames each having its count value.

In some embodiments, a count value for each video frame of the channel of video signal may be assigned as synchronization information for each video frame of the channel of video signal to form a pool of video frames each corresponding to a count value. In some embodiments, an interrupt service program may be provided to facilitate an accurate synchronous display. A channel of video signal may include a plurality of video frames. When a data acquisition port acquires a video frame, an interrupt of a Vsync signal may be triggered, and the interrupt service program may generate a count value for the Vsync signal interrupt. In some embodiments, the count values for the Vsync signal interrupt may be integers. The interrupt service program may count the number of Vsync signal interrupts and generate the count values accordingly. For example, after a data acquisition port acquires a first video frame, the count value of Vsync signal may be 1. If the data acquisition port acquires a second video frame, the count value of Vsync signal may be 2. The count values of the Vsync signal may be defined as the synchronization information of a channel of video signal.

In some embodiments, to assign the count value for each video frame of the channel of video signal, the display control device may consecutively assign a count number to each Vsync signal of each video frame consecutively occurring in each channel in increment of 1, and store the count number in each video frame as the count value for each video frame.

In 730, a determination may be made as to whether differences between count values of Vsync signals of any two video frames in the pool of video frames larger than or equal to 1. If the differences between count values of any two video frames in the pool of video frames are larger than or equal to 1, the process 700 may proceed to 740. If the differences between count values in the pool of video frames are not larger than or equal to 1, the process 700 may proceed to 760.

In 740, a determination as to whether a difference between a largest acquisition time and a smallest acquisition time is smaller than one half of time interval between two consecutive video frames. If the time difference between the largest acquisition time and the smallest acquisition time is smaller than one half of time interval between two consecutive video frames, the process 650 may proceed to 750 to reset the count value at all channels of video signals generated at the plurality of data acquisition ports to zero. Otherwise, the process 700 may also proceed to 710 to start a next round.

In some embodiments, the master processor may acquire the count value of Vsync signal corresponding to a video frame acquired from each of the plurality of data acquisition ports in real-time, and determine whether the count values of Vsync signal corresponding to the video frames acquired from the plurality of data acquisition ports are the same.

In some embodiments, the video frames may be acquired in different manners. Merely for illustration purposes, if the video frames are acquired in a manner without latency, the video frames may correspond to almost the same acquisition time. If the video frames are acquired periodically according to timers in the processing units, the acquisition time of the video frames to be spliced and displayed as a scene of a displayed video may vary from each other. For example, a first video frame may be acquired at 0.1 milliseconds, and a second video frame may be acquired at 0.7 milliseconds, and a third video frame may be acquired at 1.1 milliseconds. In some embodiments, the acquisition time of the video frames may be synchronized by the master processor 540 to the processing units 530. For example, the master processor 540 may synchronize time to the processing units 530 in real-time. Each video frame may correspond to an acquisition time.

If the count values of Vsync signal corresponding to video frames acquired from the plurality of data acquisition ports are the same, it may indicate that there is no delay (e.g., caused by abnormal events) in any of the plurality of channels of video signals. At this time, the master processor may keep monitoring the count values of Vsync signal corresponding to video frames acquired from the plurality of data acquisition ports in real-time. If the count values of Vsync signal are not the same, it may indicate that an abnormal event may occur, which causes a delay of one or more channels of video signals. For example, if two count values of Vsync signal obtained have a difference of a value larger than or equal to 1, it may indicate that the transmission of a channel of video signal has a delay due to an abnormal event. In some embodiments, the master processor may keep monitoring the acquisition time of video frames and determine whether a difference between a largest acquisition time and a smallest acquisition time is smaller than one half of time interval between two consecutive video frames (or one half of a period of each timer). In some embodiments, the master processor 540 may synchronize time to the processing units 530 at a regular time interval of, for example, 1 millisecond. When video frames are acquired, the acquisition time of the video frames may be sent to the master processor 540 in real-time. The master processor 540 may determine whether the acquired video frames are synchronous based on the acquisition time of the video frames. Merely by ways of example, if the plurality of data acquisition ports acquires a plurality of channel of video signals having a frame rate of 60 Hz, time intervals between two consecutive video frames of each channel of video signals may be 16.7 milliseconds. The master processor 540 may determine whether the acquired video frames are synchronous according to a difference between a largest acquisition time and a smallest acquisition time. In some embodiments, if the difference between the largest acquisition time and the smallest acquisition time is smaller than one half of time interval between two consecutive video frames, the master processor 540 may determine that the acquired video frames are synchronous. For example, for video signals having a frame rate of 60 Hz, time intervals between two consecutive video frames of each channel of video signals may be 16.7 milliseconds. If the difference between the largest acquisition time and the smallest acquisition time is smaller than 8 milliseconds, the video frames may be determined as synchronous. Otherwise, the video frames may be determined as asynchronous, which may indicate an abnormal event.

If it is determined that the acquired video frames are synchronous, a self-correction may be performed. The master processor may generate a resetting instruction that instructs all of the plurality of data acquisition ports to recount the Vsync signal from 0, and send the resetting instruction to the processing units so as to notify the plurality of data acquisition ports to recount the Vsync signal from 0, which may calibrate the delay caused by an abnormal event.

In 750, the display control device may reset the count value at all channels of video signals generated at the plurality of data acquisition ports to zero. The master processor may generate a resetting instruction that instructs all of the plurality of data acquisition ports to recount the Vsync signal from 0, and send the resetting instruction to the plurality of data acquisition ports so as to notify the plurality of data acquisition ports to recount the Vsync signal from 0, which may calibrate the delay caused by an abnormal event.

After the display control device may reset the count value at all channels of video signals, the process 700 may return back to 710. The abnormal event may include or relates to a system rebooting, a cable (e.g., a cable connecting the device for generating video sources and the display control device) loosening, a source device rebooting, or a graphics card hibernation, or the like, or any combination thereof.

In 760, the display control device may select video frames having the same count value as synchronized video frames. The display control device may select video frames from the plurality of channels of video signals having the same count value of Vsync signal (i.e., the same synchronization information) as synchronized video frames, and send the selected video frames and the corresponding synchronization information to the at least one display terminal at the same time. In this way, the at least one display terminal may synchronously display of the video frames according to the synchronization information. In some embodiments, the master processor may acquire synchronization information (i.e., count value of Vsync signal) of video frames to be buffered in the display queues periodically.

In 760, the display control device may transmit the synchronized video frames for synchronous display on at least one display. In some embodiments, the master display control of the master processor may control the synchronous display of the synchronized video frames on the at least one display. Details regarding the display control of video frames may be disclosed elsewhere, for example, FIG. 8 and the descriptions thereof.

Figure 8:
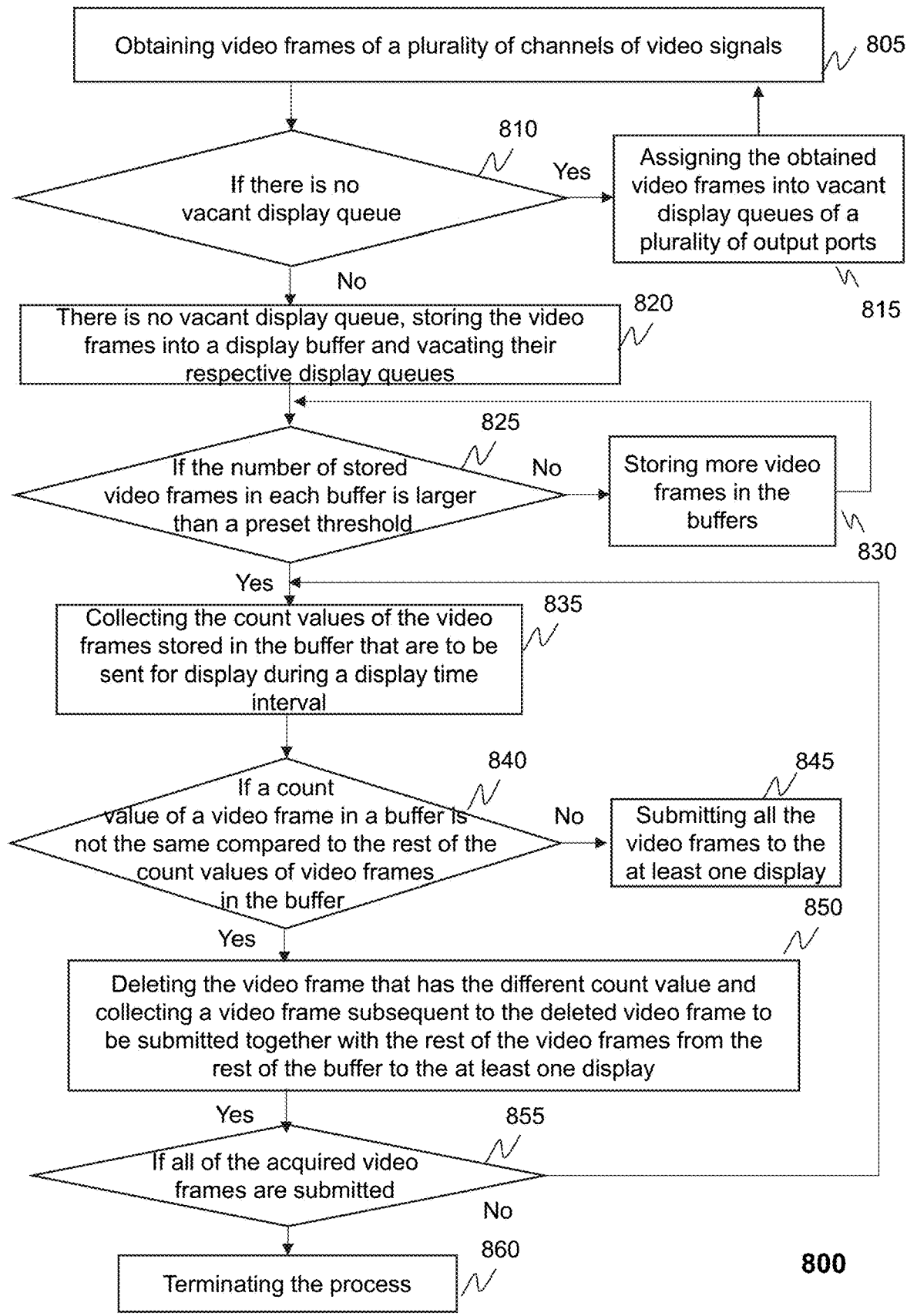
FIG. 8 is a flow chart illustrating an example display control process according to some embodiments of the present disclosure.

FIG. 8 is a flow chart of an example display control process according to some embodiments of the present disclosure. In some embodiments, the process 800 may be implemented on the video displaying system 100 as illustrated in FIG. 1. For example, the process 800 may be stored in a storage medium (e.g., the storage 227 of the computing device 228) as a form of instructions and invoked and/or executed by the display control device as illustrated in FIG. 5. The operations in the process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below may not be intended to be limiting. In some embodiments, the process for controlling display of video frames may be performed by the master display control of the display control device.

In 805, the display control device may obtain video frames of a plurality of channels of video signals. Video frames from the channels of video signals may be distributed into the display queues associated with the at least one display terminal. In some embodiments, each of the at least one display may correspond to a display queue. Each display queue may buffer a certain number of video frames, for example, 12 video frames. When the plurality of channels of video signals are sent through the plurality of output port, the time at which a first video frame in a video transmitted through each output port reaches a display queue of the at least one display terminal may be different. If the at least one display terminal buffers the received video frames directly, it is possible that video frames buffered earlier may not be synchronous with video frames buffered later.

In 810, the display control device may determine if there is no vacant display queue. During the buffering process, after all vacant display queues of the multiple display queues of the at least one display terminal is occupied, the multiple display queues may be cleared up by deleting video frames stored in the occupied display queues. And subsequential video frames may be buffered into the cleared up display queues. If there is no vacant display queue, the process may proceed to 820 to store the video frames into a display buffer and vacate their respective display queues. if there is at least one vacant display queue, the process may proceed to 815 to assign the obtained video frames into vacant display queues of the plurality of output ports.

In 815, the display control device may assign the obtained video frames into vacant display queues of the plurality of output ports. If at least one vacant display queue, the display control device may assign the obtained video frames into the at least one vacant display queue of the plurality of output ports.

In 820, the display control device may store the video frames into a display buffer and vacate their respective display queues. In some embodiments, the display buffer may include a graphic card of the at least one display. If there is no vacant display queue, the display control device may store the video frames into a display buffer and vacate their respective display queues.

In 825, the display control device may determine if the number of stored video frames in each buffer is larger than a preset threshold. If the number of stored video frames in each buffer is larger than or equal to the preset threshold, the process may proceed to 835 to collect the count values of the video frames stored in the buffer that are to be sent for display during a display time interval. If the number of stored video frames in the buffer is less than the preset threshold, the process may proceed to 830 to store more video frames in the buffers and repeat the determination step.

In 830, the display control device may store more video frames in the buffers. The display control device keeps storing video frames into the buffers until the number of stored video frames in the buffers is larger than or equal to the preset threshold.

In 835, the display control device may collect the count values of the video frames stored in the buffer that are to be sent for display during a display time interval. In some embodiments, the display control device may collect the count values of the video frames stored in the buffers that are to be sent for display during the display time interval. In some embodiments, the display time interval may be set by a user, according to default settings of the display control device, etc. In some embodiments, the display time interval may be less than 1 tenth of a second.

In 840, the display control device may determine if a count value of a video frame in a buffer is not the same compared to the rest of the count values of video frames in the buffer. If the count value of the video frame in the buffer is not the same compared to the rest of the count values of video frames in the buffer, the process may proceed to 850 to delete the video frame that has the different count value and collect a video frame subsequent to the deleted video frame to be submitted together with the rest of the video frames from the rest of the buffer to the at least one display.

If all the video frames stored in the buffers have the same count value, the process may proceed to 845 to submit all the video frames to the at least one display.

In 845, the display control device may submit all the video frames to the at least one display.

In 850, the display control device may delete the video frame that has the different count value and collect a video frame subsequent to the deleted video frame to be submitted together with the rest of the video frames from the rest of the buffer to the at least one display.

After the display control device submits all the video frames to the at least one display, or deletes the video frame that has the different count value and collects a video frame subsequent to the deleted video frame to be submitted together with the rest of the video frames from the rest of the buffer to the at least one display, the display control device may repeat the operations in 835 through 850 to submit subsequent video frames to the at least one display terminal.

In 855, the display control device may determine if all of the acquired video frames are submitted. If all of the acquired video frames are submitted, the process 800 may proceed to 860 to terminate the display control process 800. Otherwise, the display control device may repeat the operations in 835 through 850 to submit subsequent video frames to the at least one display terminal.

In 860, the display control device may terminate the process 800.

Figure 9:
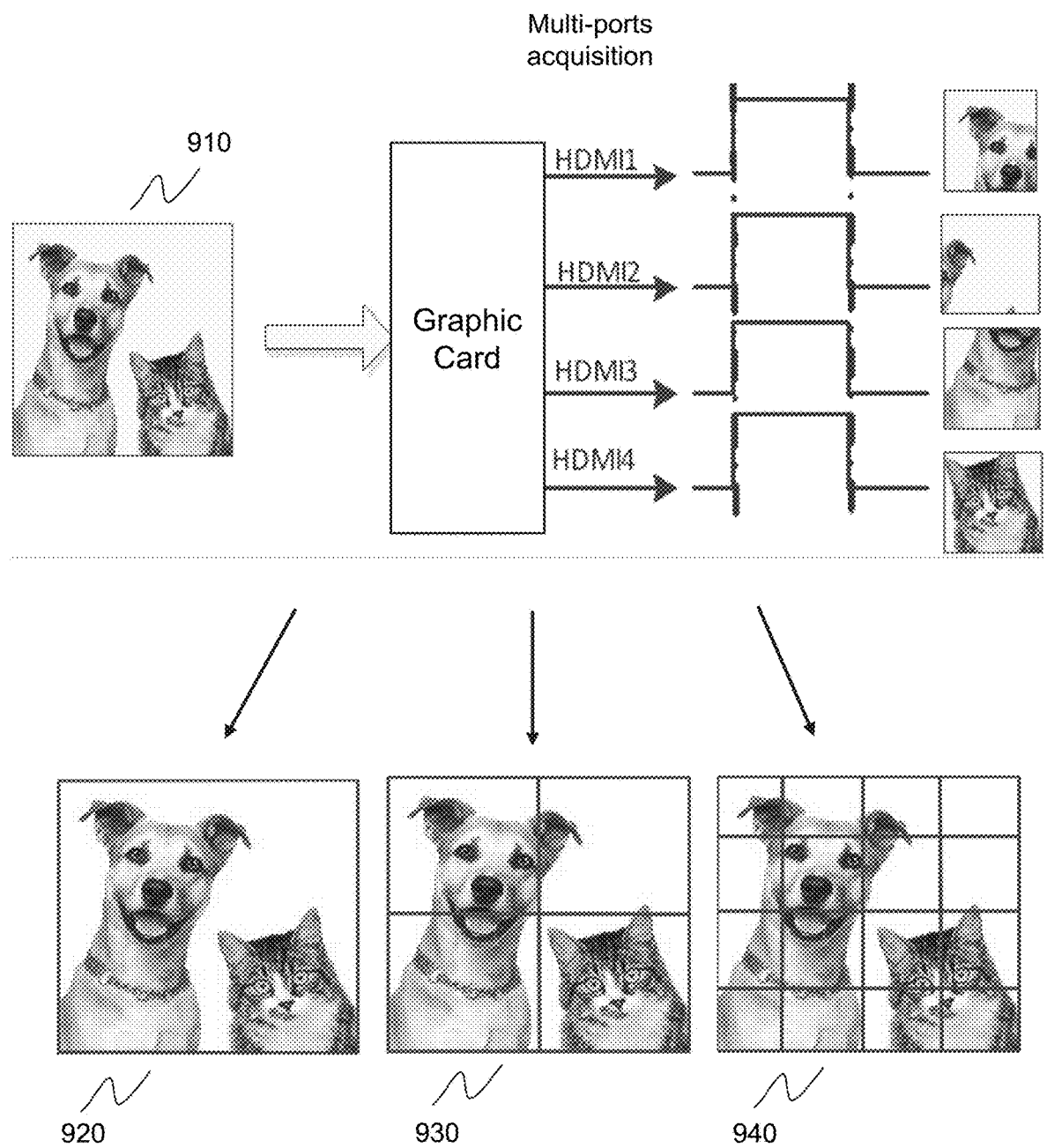
FIG. 9 is a schematic diagram illustrating output options of video signals acquired by a device having multiple input ports according to some embodiments of the present disclosure.

FIG. 9 is a schematic diagram illustrating output options of video signals acquired by a device having multiple input ports according to some embodiments of the present disclosure. Referring to FIG. 9, a display control device including 4 data acquisition ports (e.g., HDMI 1, HDMI 2, HDMI 3, and HDMI 4) as shown in FIG. 5 may be used to acquire four channels of video signals from a video source 910, and output the acquired four channels of video signals through multiple output ports. Video frames in the acquired four channels of video signals may correspond to the same count values of Vsync signal. The at least one display terminal may include a display screen which is divided into multiple parts or multiple display screens. In some embodiments, the at least one display terminal may include a display screen which is divided into multiple parts. Each part displays corresponding video frames of video signals acquired by the four data acquisition ports. In some embodiments, the at least one display terminal may include multiple display screens. Each display screen displays corresponding video frames of video signals acquired by the four data acquisition ports. In some embodiments, the at least one display terminal may include only one display screen 920. Video frames output through the plurality of output ports may be spliced and displayed on the display screen 920. In some embodiments, the at least one display terminal may include four display screens 930. Video frames output through the plurality of output ports may be organized and spliced and synchronously displayed on the four display screens 930. In some embodiments, the at least one display terminal may include sixth display screens 940. Video frames output through the plurality of output ports may be organized and spliced and synchronously displayed on the sixth display screens 940.

Merely for illustration purpose, the display control device including four output ports and each output port connecting a display screens may be taken as an example. If the resolution of a channel of video signal acquired by each data acquisition port is 1080P, i.e., 1920×1080 pixels, the resolution of the video output by each of the four output ports may be ¼ of the originally acquired channel of video signal, which may be 1080P×4/4, i.e., 1920×1080 pixels. In comparison with the conventional display control device in the prior art as illustrated in FIG. 4, if a channel of video signal is acquired through one data acquisition port of the conventional display control device and output through four output ports of the conventional display control device, and the resolution of the originally acquired channel of video signal is 1080P, the resolution of the displayed video is 1080P/4 (i.e., 960×540 pixels). Thus, the video splicing and displaying method and device provided in the present disclosure improve the resolution of the displayed video.

It should be noted that FIG. 9 and the descriptions above is merely for illustration purposes, and not intended to limit the scope of the present disclosure. For people having ordinary skills in the art, multiple variations and modifications may be made under the teachings of the present disclosure. However, those variations and modifications do not depart from the scope of the present disclosure. For example, the video frames output through the plurality of output ports may be organized and spliced into a video of a suitable resolution regardless of the resolution of the acquired video frames, as long as the frame rate of the video output through the plurality of output ports may be the same as the frame rate of the video signals acquired through the plurality of data acquisition port. The resolution of the output video on display may be adjusted by performing a scaling operation according to actual requirements, such as the requirements of the display equipment. As another example, the video frames may be spliced and displayed on the at least one display terminal including a display screen which is divided into a number of parts or a number of display screens.

It will be apparent to those skilled in the art that various changes and modifications can be made in the present disclosure without departing from the spirit and scope of the disclosure. The present disclosure may be intended to include such modifications and variations if the modifications and variations of the present disclosure are within the scope of the claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the example embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A method implemented on a device having a plurality of data acquisition ports, a plurality of output ports, and at least one processor having a master acquisition control controlling the acquisition ports and a master display control controlling the output ports for synchronous video display on at least one display, the method comprising:
    receiving a channel of video signal from each data acquisition port of the plurality of data acquisition ports during a time interval, each channel of video signal comprising a plurality of video frames captured during the time interval;
    assigning a count value for each video frame of the channel of video signal as synchronization information for each video frame of the channel of video signal to form a pool of video frames each corresponding to a count value;
    performing a self-correction when an abnormal event associated with a display control device occurs, the self-correction comprising:
        determining that the differences between count values of any two video frames recorded during the time interval is larger than 1;
        determining that a difference between a largest acquisition time and a smallest acquisition time is smaller than one half of a time interval between two consecutive video frames, and
        resetting the count value at each channel of the plurality of data acquisition ports before assigning a new synchronized count value to each channel;
    selecting video frames with the same count value from the pool of video frames as synchronized video frames; and
    transmitting, through the plurality of output ports, the synchronized video frames for synchronous display on the at least one display.

2. The method of claim 1, wherein the time interval is between 200 milliseconds to 2 seconds.

3. The method of claim 1, wherein assigning the count value for each video frame of the channel of video signal comprises:
    consecutively assigning a count number to each Vsync signal of each video frame consecutively occurring in each channel in increment of 1, and
    storing the count number in each video frame as the count value for each video frame.

4. The method of claim 1, wherein the count value for each video frame of a channel is stored in a shared memory or a preset mapping address.

5. The method of claim 1, wherein the abnormal event associated with the display control device relates to a system rebooting, a cable loosening, a source device rebooting, or a graphics card hibernation.

6. The method of a claim 1, wherein there are multiple display queues associated with the at least one display, the method further comprising:
    distributing video frames from the channels of video signals into the display queues associated with the at least one display;
    determining if there is no vacant display queue;
        in response to determining that there is no vacant display queue, storing the video frames into a display buffer and vacating their respective display queues; and
        in response to determining that there is at least one vacant display queue, assigning the video frames into vacant display queues of a plurality of output ports and repeating the distributing and determining steps.

7. The method of claim 6, further comprising:
    determining if the number of stored video frames in each buffer is larger than a preset threshold,
        in response to determining that the number of stored video frames in each buffer is larger than or equal to the preset threshold, collecting the count values of the video frames stored in the buffer that are to be sent for display during a display time interval, and
        in response to determining that the number of stored video frames in each display queue is less than the preset threshold, storing more video frames in the buffers and repeating the determination step.

8. The method of claim 7, further comprising:
    in response to determining that a count value of a video frame in a buffer is not the same compared to the rest of the count values of video frames in the buffer, deleting the video frame that has the different count value and collecting a video frame subsequent to the deleted video frame to be submitted together with the rest of the video frames from the rest of the buffer to the at least one display.

9. The method of claim 8, further comprising:
    in response to determining that all the video frames stored in the display queues have the same count value, submitting all the video frames to the at least one display.

10. The method of claim 8, wherein the display time interval is less than one tenth of a second.

11. A device having a plurality of data acquisition ports, a plurality of output ports, and at least one processor having a master acquisition control controlling the acquisition ports and a master display control controlling the output ports for synchronous video display on at least one display, the device being configured to:
    receive a channel of video signal from each data acquisition port of the plurality of data acquisition ports during a time interval, each channel of video signal comprising a plurality of video frames captured during the time interval;
    assign a count value for each video frame of the channel of video signal as synchronization information for each video frame of the channel of video signal to form a pool of video frames each corresponding to a count value;
    perform a self-correction when an abnormal event associated with a display control device occurs, the self-correction comprising:
        determining that the differences between count values of any two video frames recorded during the time interval is larger than 1;
        determining that a difference between a largest acquisition time and a smallest acquisition time is smaller than one half of a time interval between two consecutive video frames, and
        resetting the count value at each channel of the plurality of data acquisition ports before assigning a new synchronized count value to each channel;
    select video frames with the same count value from the pool of video frames as synchronized video frames; and
    transmit, through the plurality of output ports, the synchronized video frames for synchronous display on the at least one display.

12. The device of claim 11, wherein to assign the count value for each video frame of the channel of video signal, the device is configured to:
consecutively assign a count number to each Vsync signal of each video frame consecutively occurring in each channel in increment of 1, and
store the count number in each video frame as the count value for each video frame.

13. The device of claim 11, wherein the count value for each video frame of a channel is stored in a shared memory or a preset mapping address.

14. The device of claim 11, wherein the abnormal event associated with the display control device relates to a system rebooting, a cable loosening, a source device rebooting, or a graphics card hibernation.

15. The device of claim 11, wherein there are multiple display queues associated with the at least one display, and the device is further configured to:
distribute video frames from the channels of video signals into the display queues associated with the at least one display;
determine if there is no vacant display queue;
in response to determining that there is no vacant display queue, store the video frames into a display buffer and vacating their respective display queues; and
in response to determining that there is at least one vacant display queue, assign the video frames into vacant display queues of a plurality of output ports and repeat the distribution and determination steps.

16. The device of claim 15, wherein the device is further configured to:
determine if the number of stored video frames in each buffer is larger than a preset threshold,
in response to determining that the number of stored video frames in each buffer is larger than or equal to the preset threshold, collect the count values of the video frames stored in the buffer that are to be sent for display during a display time interval, and
in response to determining that the number of stored video frames in each display queue is less than the preset threshold, store more video frames in the buffers and repeat the determination step.

17. The device of claim 16, wherein the device is further configured to:
in response to determining that a count value of a video frame in a buffer is not the same compared to the rest of the count values of video frames in the buffer, delete the video frame that has the different count value and collect a video frame subsequent to the deleted video frame to be submitted together with the rest of the video frames from the rest of the buffer to the at least one display.

18. A non-transitory computer readable medium, comprising at least one set of instructions for synchronous video display on the at least one display, wherein when executed by a device including a plurality of data acquisition ports, a plurality of output ports, and at least one processor having a master acquisition control controlling the acquisition ports and a master display control controlling the output ports, the at least one set of instructions causes the device to perform a method, the method comprising:
receiving a channel of video signal from each data acquisition port of the plurality of data acquisition ports during a time interval, each channel of video signal comprising a plurality of video frames captured during the time interval;
assigning a count value for each video frame of the channel of video signal as synchronization information for each video frame of the channel of video signal to form a pool of video frames each corresponding to a count value;
performing a self-correction when an abnormal event associated with a display control device occurs, the self-correction comprising:
determining that the differences between count values of any two video frames recorded during the time interval is larger than 1;
determining that a difference between a largest acquisition time and a smallest acquisition time is smaller than one half of a time interval between two consecutive video frames, and
resetting the count value at each channel of the plurality of data acquisition ports before assigning a new synchronized count value to each channel;
selecting video frames with the same count value from the pool of video frames as synchronized video frames; and
transmitting, through the plurality of output ports, the synchronized video frames for synchronous display on the at least one display.

* * * * *